Sept. 4, 1923.   1,466,958
S. P. PIETSZAK
SAFETY BRAKE OPERATING MEANS FOR FREIGHT AND PASSENGER CARS
Original Filed June 19, 1920
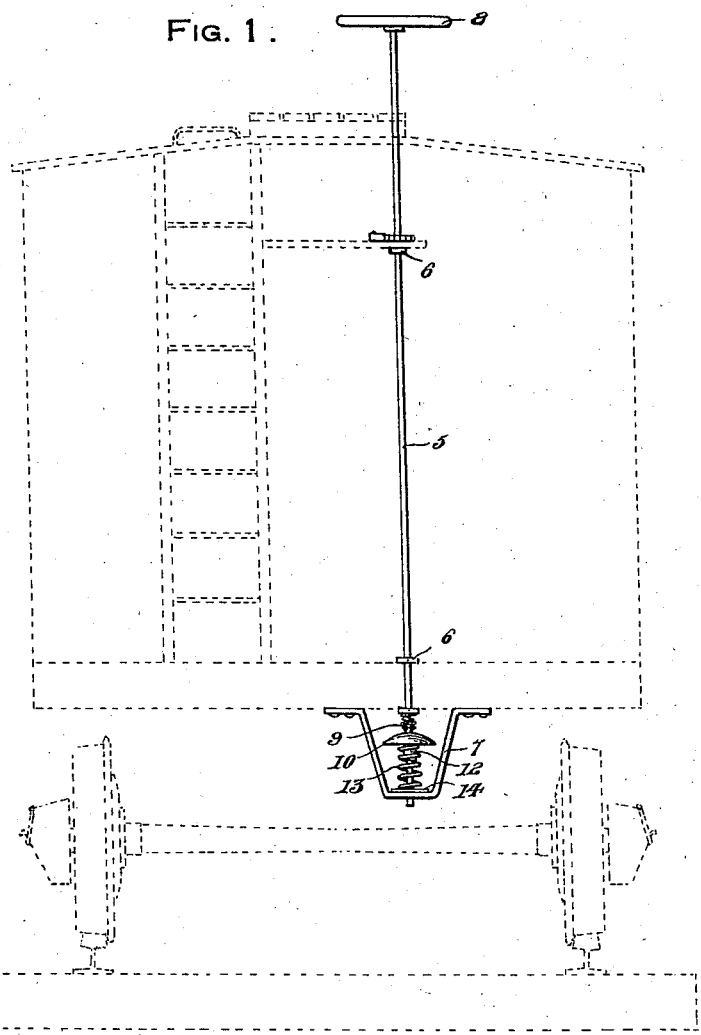
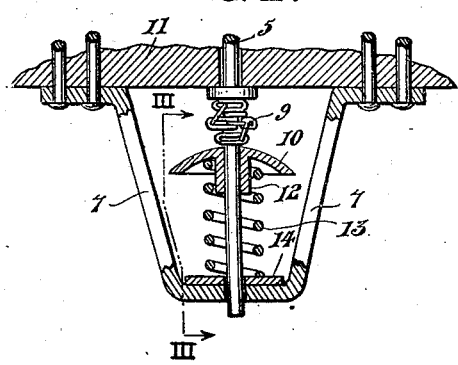
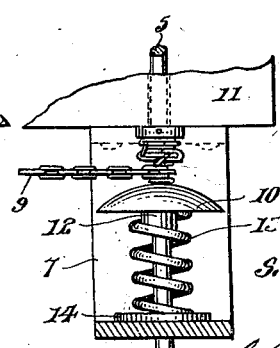
Inventor
S. P. Pietszak
By A. M. Wilson
Attorney Patented Sept. 4, 1923.

1,466,958

UNITED STATES PATENT OFFICE.

STANLEY P. PIETSZAK, OF BUFFALO, NEW YORK.

SAFETY-BRAKE OPERATING MEANS FOR FREIGHT AND PASSENGER CARS.

Application filed June 19, 1920, Serial No. 390,291. Renewed January 31, 1923.

*To all whom it may concern:*

Be it known that I, STANLEY P. PIETSZAK, a citizen of the United States of America, residing at Buffalo, in the county of Erie and State of New York, have invented certain new and useful Improvements in Safety-Brake Operating Means for Freight and Passenger Cars, of which the following is a specification.

This invention relates to certain new and useful improvements in safety brake operating means for freight and passenger cars wherein the brakes are operated by hand or manually.

With the brake operating means now in general use, it often happens that the brakeman loses control of the brakes because of the fact that the brake chain is too long and falls down and becomes wedged in the narrow part of the brake shaft bracket so that operation of the brake by hand is made practically impossible with the result that often times great damage to the cars and shipments is done and oftentimes lives are lost through the running of the freight cars or the like at random or not under control.

The present invention is particularly designed to prevent this wedging of the brake chain in the narrow part of the brake shaft bracket so that no obstruction will be presented to the free manual operation of the brakes at all times whereby shifting the cars from grades or humps may be carried on with absolute safety.

The invention broadly comprises means associated with the brake shaft for causing the chain to wind up around the brake shaft instead of down so as to insure against the wedging of the chain in the lower part of the bracket, said means being downwardly yieldable so as to gradually uncover the brake shaft when necessary for the winding of more of the chain thereon.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views, Figure 1 is an elevational view of a brake shaft and associated parts equipped with the safety device of the present invention and in proper relation with a freight car which is indicated by dotted lines, Figure 2 is a view of the lower portion of the brake operating means shown in Figure 1, on a larger scale and partly in elevation and Figure 3 is a vertical sectional view taken substantially upon line III—III of Figure 2.

Referring more in detail to the several views, the present invention is adapted for use in connection with the usual brake shaft 5 which, on freight cars, is usually journaled at one end of the car in suitable bearings 6 and a substantially U-shaped lower bracket 7, the shaft 5 extending above the top of the freight car as shown in Figure 1, and being provided with an operating hand wheel 8 on its upper end. The chain for operating the brakes is shown at 9 and is anchored in the usual manner to the lower end portion of the shaft 5 so as to be wound upon the latter as usual when said shaft is rotated in the proper direction.

The present invention, which is designed to insure winding of the chain 9 about the shaft 5 above the base of the bracket 7 so that said chain will not become wedged in the narrow part of the bracket formed by the convergence of the legs of the latter, preferably consists of a substantially saucer-shaped and inverted disk 10 slidably disposed upon the lower end portion of the shaft 5 between the floor 11 of the freight car and the base of the bracket 7 as clearly shown in the drawings. The disk 10 is provided with a hub in the form of a depending sleeve 12 encircled by the upper end of a helical compression spring 13 whose lower end rests upon a washer 14 resting upon the base of the bracket 7 and disposed on the shaft 5. The washer is merely employed for insuring easy movement, and the spring 13 yieldingly holds the disk 10 upwardly for causing the chain 9 to be wound on the shaft 5 some distance above the base of the bracket 7. The sleeve 12 provides a purchase for the spring 13 so as to keep the latter from contacting with the spring 5 and interfering with its free rotation.

It is believed that the construction and operation of the present invention will be readily understood and its advantages appreciated from the foregoing description by those skilled in the art.

Minor changes may be made without departing from the spirit and scope of the invention as claimed.

Having thus described my invention what I claim as new and desire to secure by Letters Patent, is:—

1. In combination with the vertical brake shaft of hand car brakes having a downwardly narrowing bracket at its lower end with the base of the bracket below the point of attachment of the chain of the brake to said shaft, of means for causing said chain to be wound up around the brake shaft when the latter is rotated instead of down whereby wedging of the chain in the bracket is prevented, said means comprising a disk slidably mounted upon the lower end of said shaft and normally yieldingly elevated.

2. In combination with the vertical brake shaft of hand car brakes having a downwardly narrowing bracket at its lower end with the base of the bracket below the point of attachment of the chain of the brake to said shaft, of means for causing said chain to be wound up around the brake shaft when the latter is rotated instead of down whereby wedging of the chain in the bracket is prevented, said means comprising a disk slidably mounted upon the lower end of said shaft and normally yieldingly elevated, by means of a helical spring surrounding said shaft, said disk being provided with a depending hub in the form of a sleeve surrounded by the upper end of said spring.

3. In combination with the vertical brake shaft of hand car brakes having a downwardly narrowing bracket at its lower end with the base of the bracket below the point of attachment of the chain of the brake to said shaft, of means for causing said chain to be wound up around the brake shaft when the latter is rotated instead of down whereby wedging of the chain in the bracket is prevented, said means comprising a disk slidably mounted upon the lower end of said shaft and normally yieldingly elevated by means of a helical spring surrounding said shaft, said disk being provided with a depending hub in the form of a sleeve surrounded by the upper end of said spring, and a washer on the shaft resting on said bracket and having the lower end of said spring bearing thereon, said disk being of substantially inverted saucer-shaped form.

In testimony whereof I affix my signature.

STANLEY P. PIETSZAK.